United States Patent [19]

Nicola et al.

[11] Patent Number: 4,940,632

[45] Date of Patent: Jul. 10, 1990

[54] FOAM LAMINATES WHICH INCLUDE ASTM E-84 CLASS 1 RATED FOAMS

[75] Inventors: William J. Nicola, Burgettstown, Pa.; Wolfgang W. Reichmann, Leverkusen, Fed. Rep. of Germany

[73] Assignee: Mobay Corporation, Pittsburgh, Pa.

[21] Appl. No.: 418,429

[22] Filed: Oct. 6, 1989

[51] Int. Cl.$^5$ .............................................. B32B 9/00
[52] U.S. Cl. ............................. 428/318.4; 428/319.1; 521/172; 521/174
[58] Field of Search .................... 428/318.4, 319.1; 521/172, 174

[56] References Cited

U.S. PATENT DOCUMENTS 4,544,679  10/1985  Tideswell et al. .................. 521/116
4,797,428   1/1989  Reichmann ........................ 521/137

OTHER PUBLICATIONS

Hercules Technical Data, Bulletin S166A, Dec. 1977.
Hercules Technical Data, Bulletin OR-255, Apr., 1980.
Mobail Chemical Product Bulletin, Nov. 20, 1978.
Polyester Polyols in Rigid Polyurethane and Polyisocyanurate Foams for Structural Building Panels, 1987, W. W. Reichmann et al.

Primary Examiner—Morton Foelak
Attorney, Agent, or Firm—Joseph C. Gil

[57] ABSTRACT

A foam laminate comprising a polyurethane foam core sandwiched between two facing material, wherein said foam core has: a flamespread as determined by ASTM E-84 of 25 or less, a smoke density as determined by ASTM E-84 of less than 450, a dimensional stability measured as a % volume change as determined by ASTM D-2126, after 28 days (1) at $-30°$ C. of no more than 1, (2) at 100° C. of no more than 8, and (3) at 70° C. and 100% relative humidity of no more than 12, and a firmness of no more than 0.6 centimeters after 5 minutes. The foam core is produced by reacting: a polymethylene poly(phenyl isocyanate) based isocyanate, one or more aromatic polyester polyols having hydroxyl functionalities of 2.4 or more and hydroxyl numbers of 350 or more, one or more polyether polyols having hydroxyl functionalities of 4 or more and hydroxyl numbers of 340 or more, one or more flame retardants, and, one or more blowing agents, one or more catalysts, and one or more surfactants.

1 Claim, No Drawings

FOAM LAMINATES WHICH INCLUDE ASTM E-84 CLASS 1 RATED FOAMS

BACKGROUND OF THE INVENTION

1. Field of the Invention

Rigid polyurethane foams are well known and are commonly prepared from organic polyisocyanates and organic polyols together with known blowing agents, surfactants and catalysts for the reaction of —OH and —NCO groups. Such foams are used in construction, refrigeration and insulation applications because they may be prepared in a wide variety of densities and because they are closed cell foams.

Perhaps the most critical requirements for rigid foams for use in building panels are the combustibility standards imposed by the various building codes in the United States. The basic combustibility test for the foam is ASTM E-84. Rigid foam used in metal faced building panels is required to pass ASTM E-84 with a Class 1 rating, flamespread of 25 or less, and smoke of less than 450. In general, panels produced on continuous laminators utilize Class 1 rated polyisocyanurate foam systems. While such systems provide high line speed and short dwell times, such systems typically have narrow processing windows. One example of this is the sensitivity of such systems to small changes in processing temperatures. In comparison, polyurethane foams are not sensitive to small changes in processing temperatures and have better adhesion to metal.

In order to improve the ASTM E-84 performance of foams, aromatic polyester polyols have been used in the production of polyurethane foams and urethane modified polyisocyanurate foams. The use of such polyester polyols is described, for example, in U.S. Pats. Nos. 4,544,679 and 4,797,428, and the various references cited therein. See also the Hercules technical data bulletin numbers S166A (dated December 1977) and OR-255 (dated April 1980), and the Mobil Chemical product bulletin dated Nov. 20, 1978.

Finally, in a paper entitled "Polyester Polyols in Rigid Polyurethane and Polyisocyanurate Foams in Structural Building Panels", presented at the Polyurethanes World Congress in late 1987, the authors therein concluded that aromatic content, functionality, free glycol content and hydroxyl number are the four key variables of polyester polyols affecting the ASTM E-84 classification of polyisocyanurate and polyurethane foams for building panels.

It was a primary object of the present invention to provide rigid polyurethane (PU) foams having an ASTM E-84 Class 1 rating as well as desirable physical and insulation properties which foams may be produced under a variety of processing conditions.

DESCRIPTION OF THE INVENTION

The present invention is directed to a foam laminate comprising a polyurethane foam core sandwiched between two facing materials, preferably metal skins, sheets or foils, wherein said foam core has the following properties:

(i) a flamespread as determined by ASTM E-84 of 25 or less, (ii) a smoke density as determined by ASTM E-84 of less than 450, (iii) a dimensional stability measured as a % volume change as determined by ASTM D-2126, after 28 days (1) at $-30°$ C. of no more than 1, (2) at $100°$ C. of no more than 8, and (3) at $70°$ C. and 100% relative humidity of no more than 12, and (iv) a firmness of no more than 0.6 centimeters after 5 minutes, and wherein said foam core is produced by reacting:

(a) a polymethylene poly(phenyl isocyanate), a isocyanate group containing prepolymer based on a polymethylene poly(phenyl isocyanate), or mixtures thereof, (b) from 37 to 43% by weight of one or more aromatic polyester polyols having hydroxyl functionalities of 2.4 or more and hydroxyl numbers of 350 or more, or a mixture of aromatic polyester polyols, with said mixture having an average hydroxyl functionality of 2.4 or more and an average hydroxyl number of 350 or more, 39% by weight of one or more, (c) from 31 to 39% by weight of one or more polyether polyols having hydroxyl functionalities of 4 or more and hydroxyl numbers of 340 or more, (d) from 22 to 30% by weight of one or more flame retardants, and, (e) one or more blowing agents, one or more catalysts, and one or more surfactants, said % by weight totalling 100%, wherein the amount of component (b) is greater than component (c), and wherein the isocyanate index is from about 100 to about 115.

The isocyanate materials useful in the practice of the present invention include any of the polyphenyl polymethylene polyisocyanates which may be obtained by aniline-formaldehyde condensation followed by phosgenation (crude MDI). Also preferred are the isocyanate prepolymers prepared by reacting the polyphenyl polymethylene polyisocyanates with hydroxyl functional materials. Typically, such prepolymers will have isocyanate group contents of from 15 to 31% by weight.

Substantially any of the aromatic polyester polyols known in the art are useful herein so long as they have the required hydroxyl functionality and hydroxyl number. In the case of mixtures, the mixture must have the requisite hydroxyl functionality and hydroxyl number. Specific commercially available polyesters include RES D 304 (having a functionality of 2.5, an hydroxyl number of 440, and available from Cape Industries), RES D 304 A (having a functionality of 2.5, an hydroxyl number of 420, and available from Cape Industries), Rymsapol 186 (having a hydroxyl functionality of 2.5, an hydroxyl number of 460, and available from Resinas y Materiales), Rymsapol RC-101 (having a hydroxyl functionality of 2.5, an hydroxyl number of 552, and available from Resinas y Materiales), Rymsapol RC-126 (having a hydroxyl functionality of 2.5, an hydroxyl number of 443, and available from Resinas y Materiales), Bayer P-277 (having a hydroxyl functionality of 2.9, an hydroxyl number of 450, and available from Bayer AG), and Bayer P-276 (having a hydroxyl functionality of 2.4, an hydroxyl number of 435, and available from Bayer AG).

In addition to the polyester polyol which is required in the present invention, the polyether component may be any of the conventional polyether polyols known to those skilled in the art, so long as they have the required hydroxyl functionality and hydroxyl number. Specific commercially available polyethers useful herein include the following sucrose based polyethers available from Mobay:

| Name | OH # | OH F |
| --- | --- | --- |
| Multranol M-4034 | 470 | 5.2 |
| Multranol M-4030 | 380 | 5.8 |
| Multranol M-9171 | 340 | 5.7 |
| Multranol M-9173 | 460 | 5.6 |
| Multranol M-9153 | 367 | 6.4 |

Although not preferred, the reaction mixture can also contain up to 10% by weight based on the total weight of components b), c), and d) of other isocyanate-reactive compounds, so long as the blend of polyols has an overall average hydroxyl functionality of 4.0 or more and an overall average hydroxyl number of 340 or more. Such compounds are those compounds with less than five hydrogen atoms that are reactive toward isocyanates having a molecular weight generally of 400 to 10,000. Compounds that contain amino groups, thio groups or carboxyl groups as well as compounds that contain hydroxyl groups may be used. Compounds which contain hydroxyl groups, particularly compounds that contain 2 to 4 hydroxyl groups, specifically those having a molecular weight of 400 to 6000, preferably 600 to 4000 are preferred. Polyesters, polyethers, polythioethers, polyacetals, polycarbonates and polyesteramides having 2 to 4 hydroxyl groups known to be useful in the production of homogeneous and cellular polyurethanes (described e.g., in U.S. Pat. No. 4,544,679) are among the more preferred isocyanate-reactive materials. Particularly preferred are polyethers which are obtained through the addition of one or more alkleneoxyides (ethylene oxide and particularly propylene oxide) or bi- or multivalent "starters" such as propylene glycol, glycerin, triethanolamine or trimethylol propane. Polyethers which contain polyaddition products of diisocyanates and hydrazine and/or diamines and/or glycols or polymers and/or graft polymers (preferably of styrene or acrylonitrile) in dispersed or dissolved form are also preferred. These polyethers generally have an average functionality of more than 2.0.

Surfactants are typically employed in the preparation of rigid foams of the urethane and isocyanurate type. Silicone fluids which improve the cell size and uniformity of the foam are among the most commonly used surfactants. One particular surfactant which has been successfully employed in the practice of the present invention is a silicone fluid manufactured by Goldschmidt available under the designation Tegostab B-8404.

Any known catalyst for the reaction of isocyanate groups with hydroxyl groups may be used in the practice of the present invention. Such catalyst may be used alone or together with a catalyst for the isocyanurate ring formation reaction to produce foams in accordance with the present invention. Any catalyst which is capable of catalyzing the simultaneous urethane and isocyanurate reactions may also be used. Trimer catalysts such as DMP-30 (a dimethylaminomethyl substituted phenol available from Rohm & Haas) and Potassium Hex-Cem 977 (a potassium octoate available from Mooney Chemicals) admixed with dimethylaminoethanol, a tertiary amine urethane catalyst manufactured by Rhein-Chemie (9/1 ratio by weight) are preferred catalysts.

Conventional polyurethane foam blowing agents are used in the preferred embodiment of the present invention. Vaporizable liquid halogenated hydrocarbons such as trichlorofluoromethane are preferred.

The flame retardant materials useful herein are also known in the art, and are commercially available. Preferred flame retardants include PHT-4 DIOL, available from Great Lakes Chemical (or the equivalent Ethyl Corporation product RB-79), tris(chloropropyl) phosphate (Fyrol PCF, available from Akzo Chemical, Antiblaze 80, available from Mobil, and Pelron 9338, available from Pelron), KPM 9214, available from PPG, Antiblaze 500, available from Mobil, Ixol B-251 and Ixol 350, both available from Kali Chemie, Fyrol CEF, available from Akzo Chemical, dimethylmethyl phosphonate-, triethyl phosphate and Kronitex FR-1028, available from FMC.

In accordance with the present invention, the isocyanate and isocyanate-reactive components may be reacted together by the known one-shot process, prepolymer process or semi-prepolymer process, in many cases using mechanical devices, such as those described in U.S. Pat. No. 2,764,565. Details about processing apparatus which may also be used according to the present invention may be found in Kunststoff-Handbuch, Volume VII, published by Vieweg and Hoechtlen, Carl-Hanser Verlag, Munich 1966, for example on pages 121 to 205.

Useful facing materials include metal foils such as aluminum foil, paper, wood panels, metal sheets, gypsum board, and other materials generally known in the art. The laminates are produced on conventional laminating equipment of the type known in the art.

As noted above, the foam core must have a firmness of no more than 0.6 centimeters after 5 minutes. The laboratory method used to make the firmness determination measures the penetration of a constant load at different times in the foaming process. The centimeter reading is obtained by applying a 1.7 Kg/cm$^2$ load to a polyethylene plunger having a circular cross section, the surface which comes into contact with the foaming sample having an area of 5.07 cm$^2$. The foam chemicals are poured into an 11 inch by 11 inch by 4 inch cardboard box in an amount sufficient to produce a foam having a height of 4 inches. Little penetration means high initial rigidity which correlates with increased productivity on a laminator.

The present invention is not to be limited to the foregoing specific examples of suitable isocyanates, surfactants, catalysts, blowing agents, fire retardants or polyols. Any of the large number of materials available from a variety of suppliers for use in polyurethane foam manufacture may be substituted for the specifically identified materials by one skilled in the art and are deemed to fall within the teachings of the present invention.

The following examples illustrate the present invention.

EXAMPLES 1 THROUGH 8

The following materials were used:

PES 1: an aromatic polyester polyol produced from dimethyl terephthalate, polyethylene terephthalate, diethylene glycol and propylene oxide, having an hydroxyl functionality of 2.5 and an hydroxyl number of 420, available as RES D 304A, from Cape Industries.

PES 2: an aromatic polyester polyol produced from dimethyl terephthalate, dipropylene glycol and propylene oxide, having an hydroxyl functionality of 2.3, an hydroxy number of 320 and available as TERATE 203 from Hercules.

PES 3: an aromatic polyester polyol produced from phthalic acid anhydride, diethylene glycol and propylene oxide, having an hydroxyl functionality of 2.9, an hydroxyl number of 450, and available from Bayer AG.

PET 1: Multranol M-4034, a commercially available sucrose/propylene glycol-initiated propylene oxide polyether having an OH number of 470 and an OH functionality of 5.2

PET 2: a glycerin/propylene oxide adduct having an OH functionality of 3 and an OH number of 1050.

FR-1: tris(chloroethyl)phosphate (Fyrol PCF).

FR-2: a brominated phthalic anhydride reacted with diethylene glycol and ethylene oxide, having an OH number of 215 (PHT-4 DIOL).

FR-3: a chlorinated phthalic anhydride reacted with diethylene glycol and ethylene oxide having an OH number of 200 (KPM 9214).

FR-4: a brominated initiator reacted with epichlorohydrin to give an OH number of 350 (Ixol 350).

Sur: L-5440, a commercially available surfactant from Union Carbide.

Cat: a 2.5/1 mixture of Dabco TMR-4 and Polycat-8, both available from Air Products.

Water

R-11: monofluorotrichloromethane

Iso-1: Mondur MR: a commercially available polymethylene poly(phenyl isocyanate) having an isocyanate content of 32% by weight and a viscosity of 200 cps at 25° C.

Iso-2: Mondur M-489: a commercially available polymethylene poly(phenyl isocyanate) having an isocyanate content of 31.4% by weight and a viscosity of 700 cps at 25° C.

Facers: A=aluminum foil; W=a 7/16" thick wood panel (oriented strand board); P=kraft paper The foam formulations shown in the following table were processed on a high pressure foam machine (Mobay's HK 100) on a continuous conveyor. The chemicals were held at a temperature of 21° C. prior to processing on the conveyor which was maintained at a temperature of 42° C. The facing materials used were as indicated in the table. The thicknesses and the widths of the products were as indicated in the table. The formulations used and the results obtained were as indicated in the table. Examples 1 and 8 are comparative examples.

TABLE

| Example | 1 | 2 | 3 | 4 | 5 | 6 | 7 | 8 |
|---|---|---|---|---|---|---|---|---|
| Facers: | A | A | W | P | P | P | A | P |
| Thickness inches | 4 | 2 | 3.5 | 3.5 | 3.5 | 3.5 | 4 | 4 |
| Width inches | 32 | 40 | 36 | 36 | 36 | 36 | 31 | 40 |
| PES 1 | — | 38.5 | 42.7 | 42.7 | 42.7 | 42.9 | — | 46.0 |
| PES 2 | 38.0 | — | — | — | — | — | 25.3 | — |
| PES 3 | — | — | — | — | — | — | 12.7 | — |
| PET-1 | 27.8 | 27.8 | 23.7 | 23.7 | 23.7 | 23.8 | 27.8 | 21.2 |
| PET-2 | 7.6 | 7.4 | 7.4 | 7.4 | 7.4 | 7.5 | 7.6 | 6.2 |
| FR-1 | 6.3 | 8.7 | 8.7 | 8.7 | 8.7 | 6.1 | 6.3 | 8.8 |
| FR-2 | 20.3 | 17.6 | 17.5 | 17.5 | — | — | 20.3 | 17.8 |
| FR-3 | — | — | — | — | — | 19.7 | — | — |
| FR-4 | — | — | — | — | 17.5 | — | — | — |
| Sur | 1.9 | 2.0 | 2.0 | 2.0 | 2.0 | 2.0 | 1.9 | 2.0 |
| Cat | 1.8 | 3.6 | 4.6 | 4.6 | 4.6 | 4.6 | 1.9 | 2.4 |
| Water | 0.6 | 0.8 | 1.0 | 1.0 | 1.0 | 1.0 | 0.6 | 0.7 |
| R-11 | 15.5 | 17.6 | 19.2 | 19.2 | 19.2 | 19.2 | 15.6 | 18.1 |
| Iso-1 | 92 | 124 | 129 | — | 135 | 130 | 97 | 118 |
| Iso-2 | — | — | — | 129 | — | — | — | — |
| RESULTS | | | | | | | | |
| Reactivity Times, secs | | | | | | | | |
| Cream | 16 | 9 | 8 | 8 | 10 | 8 | 13 | 14 |
| Gel | 37 | 33 | 18 | 18 | 27 | 25 | 47 | 42 |
| Density pcf | 2.4 | 2.3 | 2.1 | 2.1 | 2.0 | 2.0 | 2.5 | 2.4 |
| ASTM E-84 | | | | | | | | |
| Flame | 24 | 25 | 15 | 20 | 20 | 20 | 23 | 20 |
| Smoke | 220 | 396 | 214 | 229 | 263 | 186 | 373 | 286 |
| Dim. Stab. % Vol change after 28 days | | | | | | | | |
| −30° C. | 0 | <1 | <1 | <1 | <1 | <1 | 0 | <1 |
| 100° C. | 17 | 7 | 4 | 5 | 3 | 6 | 5 | 4 |
| 70° C./100% RH | 28 | 6 | 5 | 9 | 10 | 10 | 10 | 7 |
| Firmness cm after 5 minutes | — | 0.4 | 0.2 | 0.2 | 0.5 | 0.5 | 0.5 | 0.9 |

Although the invention has been described in detail in the foregoing for the purposes of illustration, it is to be understood that such detail is solely for that purpose and that variations can be made therein by those skilled in the art without departing from the spirit and scope of the invention except as it may be limited by the claims.

What is claimed is:

1. A foam laminate comprising a polyurethane foam core sandwiched between two facing material, wherein said foam core has the following properties:
   (i) a flamespread as determined by ASTM E-84 of 25 or less,
   (ii) a smoke density as determined by ASTM E-84 of less than 450,
   (iii) a dimensional stability measured as a % volume change as determined by ASTM D-2126, after 28 days (1) at −30° C. of no more than 1, (2) at 100° C. of no more than 8, and (3) at 70° C. and 100% relative humidity of no more than 12, and
(iv) a firmness of no more than 0.6 centimeters after 5 minutes, and wherein said foam core is produced by reacting:
  (a) a polymethylene poly(phenyl isocyanate), a isocyanate group containing prepolymer based on a polymethylene poly(phenyl isocyanate), or mixtures thereof,
  (b) from 37 to 43% by weight of one or more aromatic polyester polyols having hydroxyl functionalities of 2.4 or more and hydroxyl numbers of 350 or more, or a mixture of aromatic polyester polyols, with said mixture having an average hydroxyl functionality of 2.4 or more and an average hydroxyl number of 350 or more,
  (c) from 31 to 39% by weight of one or more polyether polyols having hydroxyl functionalities of 4 or more and hydroxyl numbers of 340 or more,
  (d) from 22 to 30% by weight of one or more flame retardants, and,
  (e) one or more blowing agents, one or more catalysts, and one or more surfactants, said % by weight totalling 100%, wherein the amount of component (b) is greater than component (c), and wherein the isocyanate index is from about 100 to about 115.

* * * * *